United States Patent [19]

Rosman

[11] Patent Number: 4,665,696

[45] Date of Patent: May 19, 1987

[54] HYDRAULICALLY OPERATED HOIST FOR CONTAINERIZED FREIGHT OR THE LIKE

[75] Inventor: Alan H. Rosman, Woodland Hills, Calif.

[73] Assignee: Dynamic Hydraulic Systems, Inc., Canoga Park, Calif.

[21] Appl. No.: 662,099

[22] Filed: Oct. 18, 1984

Related U.S. Application Data

[63] Continuation-in-part of Ser. No. 601,481, Apr. 18, 1984, which is a continuation-in-part of Ser. No. 570,590, Jan. 13, 1984.

[51] Int. Cl.[4] .............................................. F16D 31/02

[52] U.S. Cl. ........................................ 60/414; 60/417; 60/387; 254/386

[58] Field of Search ................. 60/905, 427, 413, 414, 60/417, 387, 479, 905; 254/385, 386

[56] References Cited

U.S. PATENT DOCUMENTS

| | | | |
|---|---|---|---|
| 2,589,366 | 3/1952 | Gauthier | 60/905 |
| 3,474,924 | 10/1969 | Wheeler | 254/386 |
| 3,494,491 | 2/1970 | Sumida | 254/386 |
| 3,762,165 | 10/1973 | Takenoshita et al. | 60/479 |
| 3,866,418 | 2/1975 | Waters | 60/427 |
| 3,871,714 | 3/1975 | Behrend | 60/905 |
| 3,917,309 | 11/1975 | Hegel et al. | 60/911 |

FOREIGN PATENT DOCUMENTS

| | | | |
|---|---|---|---|
| 1575307 | 9/1980 | United Kingdom | 60/413 |

*Primary Examiner*—Allen M. Ostrager

*Attorney, Agent, or Firm*—Hopgood, Calimafde, Kalil, Blaustein & Judlowe

[57] ABSTRACT

The invention in a preferred embodiment contemplates a dual-lift hydraulic arrangement in which each of two hydraulic-lift systems employs a power integrator in the connection between a charged hydraulic accumulator and a hydraulic actuator for cable suspension of a load. The accumulator may be a single device serving the respective hydraulic systems, each of which terminates in a traction cylinder for operating a cable lift for its end of the load suspension. A single prime mover serves both power integrators, and the pressurized charge of the accumulator is advisedly set to accommodate (counterbalance) a predetermined average of the combined load on the two actuators. The arrangement lends itself to single-handed control of both hydraulic systems and to the corrective tilt orientation of a load which may be relatively heavy at one end and relatively light at the other end.

10 Claims, 5 Drawing Figures

HYDRAULICALLY OPERATED HOIST FOR CONTAINERIZED FREIGHT OR THE LIKE

RELATED CASES

This application is a continuation-in-part of application Ser. No. 601,481, filed Apr. 18, 1984, which in turn is a continuation-in-part of original application Ser. No. 570,590, filed Jan. 13, 1984.

BACKGROUND OF THE INVENTION

The invention relates to hydraulic lift mechanism and in particular to such mechanism as is required to serve intermittent alternating vertical displacement of a load, wherein the load may be of various magnitudes within the capacity of the mechanism. Such conditions exist for hydraulically operated cranes and hoists, and the present invention is particularly concerned with dual-lift systems for coordinated handling of the respective ends of an elongate load, exemplified by a freight container within which the loading may not be uniformly distributed, thus presenting a different lifting-load demand on the respective lifts of the dual system. For simplicity of discussion herein, all references are to such a container as the load, in which case a conventional "spreader" device is to be understood as the means whereby cable-derived lift is transmitted to the container, via releasable engagement of the spreader to the four corners of the container; the word "container" is not to be understood as limiting, since the invention is applicable to the handling of other kinds of load wherein lift requirements differ at longitudinally spaced lift points of the load.

Conventional cranes and hoists of the character indicated require two independent lift systems, one for handling each of the respective ends of the container. The prime mover for each of the two lift systems is a diesel engine or one of various types of electric motor, depending upon the design capacity of the involved lift system, and the rated power of each prime mover is conservatively selected for assured handling of the maximum rated load. In most cases, each of the two lift systems requires its own gear box, speed reducer, pulling drum (or winch) and safety brake; and the operator must exercise extreme skill in coordinating the functions of these components for both systems at the same time. Illustratively, a conventional container crane with a 30-ton capacity having a 30-horsepower prime mover for each of its lift systems is able to handle its maximum load at a lifting speed of 7 feet per minute, and when weight distribution is so uneven as to present different lift demands to the respective lift systems, this lifting speed must suffer, due to the complexity of requisite operator-coordinated control.

BRIEF STATEMENT OF THE INVENTION

It is an object of the invention to provide improved crane or hoist mechanism of the character indicated.

It is a specific object to provide hydraulic means to achieve the above object.

It is a further specific object to achieve the above objects with great economy of prime-mover power, for a given system-load capacity.

It is also a specific object to achieve the above objects with greatly simplified and precise control of lift and level of the load.

Another specific object is to achieve the above objects using a single prime mover serving two independently controlled hydraulic lift systems.

A general object is to meet the above objects with simplified structure, at reduced overall expense, applicable both to new cranes and as an up-grade of existing cranes, and inherently characterized by materially reduced operating cost.

The invention in a preferred embodiment achieves the foregoing objects with a dual-lift hydraulic arrangement in which each of two hydraulic-lift systems employs what I term a power integrator in the connection between a charged hydraulic accumulator and a hydraulic actuator; the accumulator may be a single device serving the respective hydraulic systems, each of which terminates in a traction cylinder for operating the cable lift for its end of the load suspension. A single prime mover serves both power integrators, and the pressurized charge of the accumulator is advisedly set to accommodate a preselected average of the combined load upon the two actuators. Each power integrator may include a single manual control for determining the direction and rate of pressure-fluid flow through its system, namely, to or from its traction cylinder and from and to the accumulator, and the two manual controls may be so matched in side-by-side relation as to enable one-handed operation of both controls, in unison, or with transient phase displacement in response to the operator's visual determination of required leveling adjustment in view of an uneven weight distribution in the container load. Alternatively, a simple gravity-vector device affords automatic load-level control while lifting and otherwise manipulating the container.

More specifically, each hydraulic circuit which supplies its own cable actuator (traction cylinder) includes check valves, with a first pilot-operated check valve interposed between its power integrator and the accumulator, and with another pilot-operated check valve interposed between its power integrator and its cable actuator. In each hydraulic system, the pilot-operated check valves cooperate with other check valves to assure automatic transfer of hydraulic fluid from the accumulator to the involved traction cylinder (cable actuator), and vice versa, as may be determined by selective control of or via its power integrator. In each hydraulic system, check valves also cooperate with pump action associated with rotation of the power integrator, to assure that adequate fluid is drawn from a sump and is deliverable for pilot-operated functions; stated in other words, with minimum reliance upon the sump, each system provides maximum conservation of energy in effecting such transfer of pressurized hydraulic fluid, from and to the accumulator, as may be involved in any controlled lift or descent of any load, within system capacity.

A power integrator, as contemplated herein, is a rotary liquid-displacement device having two spaced flow-connection ports and an interposed rotor with externally accessible shaft connection to the rotor, and the expression "rotary" as used herein in connection with such a device is to be understood as including various known rotary-pump structures, such as gear-pump and sliding-vane devices, as well as axially reciprocating and radially reciprocating configurations, wherein rotor-shaft rotation is related to hydraulic flow into one port and out the other port. In other words, for purposes of the invention, such "rotary" devices provide for such hydraulic flow, and they provide for an external input/output torque-response relation to the hydraulic flow.

DETAILED DESCRIPTION

The invention will be illustratively described in connection with the accompanying drawings, in which.

Figure 2:
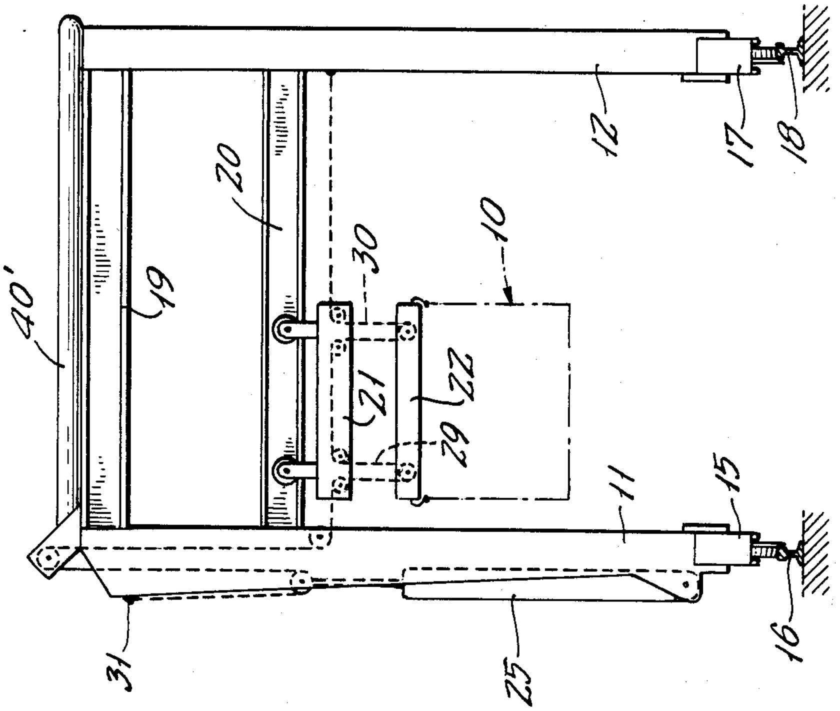
FIG. 2 is a right-end view in elevation of the crane of FIG. 1, to illustrate certain aspects of suspension cabling.
Figure 1:
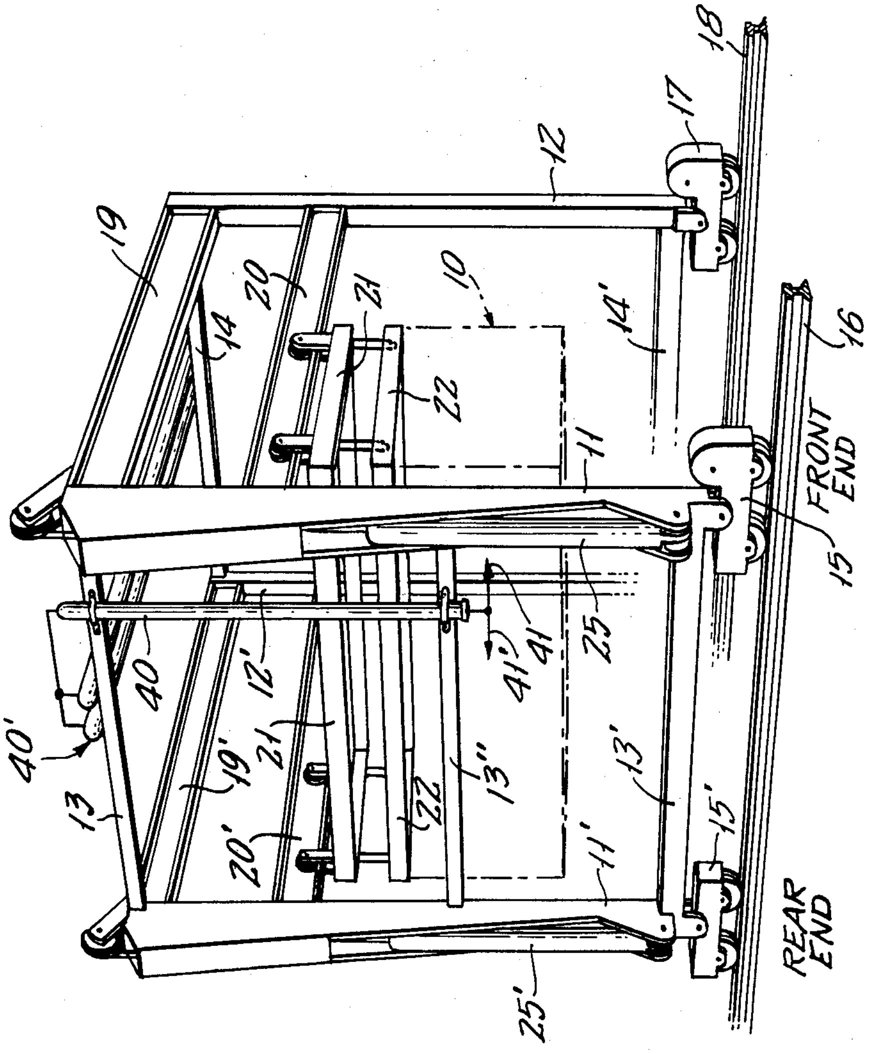
FIG. 1 is a simplified view in perspective showing a dual-lift hydraulic system of the invention, in application to a traveling gantry crane for container-freight handling, as for transfer loading of a container from a road vehicle to a rail vehicle, and vice versa.

Referring initially to FIGS. 1 and 2, the invention is shown in application to the handling of a unit 10 of containerized freight in a traveling gantry crane wherein a rigid supporting frame comprises four spaced upright columns, of which a first pair 11–11' is in a first longitudinal plane and a second pair 12–12' is in a second longitudinal plane; upper and lower horizontal members 13–13' connect columns 11–11', and similar members 14–14' connect columns 12–12', it being understood that diagonal brace members between columns 11–11' and between columns 12–12' have not been shown, for purposes of clarity in the drawing. The base of each column is trunion-connected to a two-wheel truck 15 (15') for frame members in the first plane to ride a first longitudinal rail 16, and 17 (17') for frame members in the second plane to ride a second longitudinal rail 18. Vertically spaced upper transverse beams 19–20 (19'–20') rigidly interconnect columns 11–12 (11'–12'), with ground clearance adequate for handling the load 10.

Three-component motion is available for handling the load 10, the X-component of displacement being along rails 16–18, as by motordrive of trucks 15–17. Y-component displacement is available via a carriage 21, roller-suspended beneath the transverse beams 20–20', and preferably also motor-driven. Z-component motion is imparted by suspension cabling to a so-called spreader frame 22, having means for detachable connection at or near the four upper corners of the container load 10; hydraulic operation of the suspension cabling is the subject of the invention and will be explained in detail in the further context of FIG. 3. Parenthetically, it is noted that for simplicity, the diagram of FIG. 3 treats only the matter of Z-axis or lift/descent displacement of the load; the accomplishment of Y-axis (carriage 21) displacement, without affecting Z-axis displacement, will be later discussed.

The suspension of load 10 relies on first and second separate hydraulic systems, which for simplicity will be referred to as the front-end system involving a front traction cylinder 25, and as the rear-end system involving a rear traction cylinder 25', consistent with "FRONT END" and "REAR END" legends in FIG. 1. These traction cylinders and their operation are very much like what is already described in the above-identified pending applications, to which reference may be had for further discussion, if needed.

In FIG. 1, each cylinder 25 (25') is vertically mounted to a column 11 (11') and is approximately one half the height of the column. Cylinder 25 contains a piston 26 and rod 27, the upper end of which mounts separate sheaves 28 for two suspension cables 29–30, independently serving the left and right corners of load 10, "left" and "right" being taken in the sense as viewed in FIG. 2. One end of each of cables 29–30 is secured to the frame, at 31, and the volume of pressurized hydraulic fluid in the tail end of cylinder 25 will be understood to determine the Z-component or elevation of both sides of the front end of container 10. The description given as to cylinder 25 for the front-end end suspension applies similarly for cylinder 25' for the rear-end suspension, involving two further cables 29'–30'.

Both the front-end hydraulic system and the rear-end hydraulic system are served by the same hydraulic accumulator 32 and by a single prime mover 33, which may be an electric motor or a diesel engine. The prime mover drives the rotor of a power integrator 34 (34') in each of the hydraulic systems. The prime mover may be a reversible electric motor, in which case the slant arrow 35 (35') will be understood to suggest selective variation of speed of hydraulic flow, within the range 36 (36') and directionally dependent on the direction of motor rotation; on the other hand, a unidirectional prime mover is preferred for the 30-plus load tonnage encountered in container-freight handling, in which case solenoid-operated flow-reversing and flow-speed control will be understood to be symbolized at 35 (35') and to be within the range extension symbolized at 37 (37'). Both types of direction and speed control are described in said pending applications.

As is also the case in said pending applications, the charged hydraulic accumulator 32 is employed as a "counterweight", continuously operative upon fluid in lines 38 (38') to cylinders 25 (25') to effectively balance the dead load of spreader 22, plus a predetermined live-load magnitude which is selected to be intermediate zero live load and full-rated live load, and generally one half the full-rated live load. In FIG. 1, the hydraulic accumulator is seen as a vertical tubular envelope 40, with closed ends and having a volumetric capacity at least adequate to serve the full range of operation of both traction cylinders. This envelope 40 is fixed to the near (or left) side frame, being clamped to upper member 13 and to an intermediate member 13'' connected to columns 11–11'. The bottom end of the accumulator envelope 40 has hydraulic connection to separate lines 41 (41') serving the respective front-end and rear-end hydraulic systems. It is desired that the maximum hydraulic contents of the accumulator shall be in the order of 10 percent of total accumulator volume, the remaining 90 percent accommodating pressurizing gas such as nitrogen; to provide the extra volume capacity thus required for pressurizing gas, plural elongate envelopes 40', as of steel pipe with closed ends, are arrayed horizontally atop the frame of FIGS. 1 and 2, and they are connected in tandem to the vertical envelope 40 in such manner as to provide a gas/liquid interface within envelope 40 at all times, i.e., regardless of how much hydraulic fluid has been supplied to or returned from the traction cylinders 25 (25').

More specifically, and taking first the case of the front-end hydraulic system, the line 41 for hydraulic flow to or from accumulator 32 (40/40') is connected to the line of supply to the tail end of traction cylinder 25 via pilot-operated check valves 42–43 oriented to check hydraulic flow from the accumulator on the one hand and from cylinder 25 on the other hand, in the absence of a pilot-operated opening of one or the other of these valves 42–43; and the power integrator 34 is interposed between lines 42′–43′ served by the respective check valves 42–43. The power integrator 34 is a rotary-displacement device having first and second flow-connection ports 46–47 to which lines 42′–43′ are respectively connected, and an interposed rotor has externally accessible shaft connection 48 to the prime mover 33; detailed descriptions of suitable power integrators are provided in said applications Ser. Nos. 570,590 and 601,481. Power integrator 34 is desirably a variable flow device, wherein variation in flow may be a function of a manual control, for example, a directly applied torque or using a fluid-pressure assist in applying the control torque.

It is preferred that pilot opening of the respective check valves 42–43 shall be in response to a single actuating pressure. Thus, a line 51 establishes parallel connection of the respective pilots of check valves 42–43, and the circumstance of sufficient hydraulic pressure in a control line 52 is operative to dislodge both check valves 42–43 from their normally closed condition. This line-52 control connection additionally includes a solenoidoperated valve 53 which is normally positioned to discharge pressure fluid in line 52 to sump but which is solenoid-actuable to enable pressure fluid in either of the intergrator-port lines 46–47 (42′–43′) to pass via line 52 for concurrent pilot-driven opening of both check valves 42–43, there being isolation check valves 54–55 (connected back to back at 56 to valve 53) to assure integrity of the described pilot-operating connection 52.

Two further check valves 56–57 in separate lines 58–59 of connection, from a sump 50 to the respective port connections 46–47 of the power integrator, are operative to assure an initial supply of hydraulic fluid to the power integrator, no matter what the initial direction of drive from prime mover 33; specifically, each of the check valves 56–57 is oriented to check or block any flow in the direction of sump 50.

Figure 3:
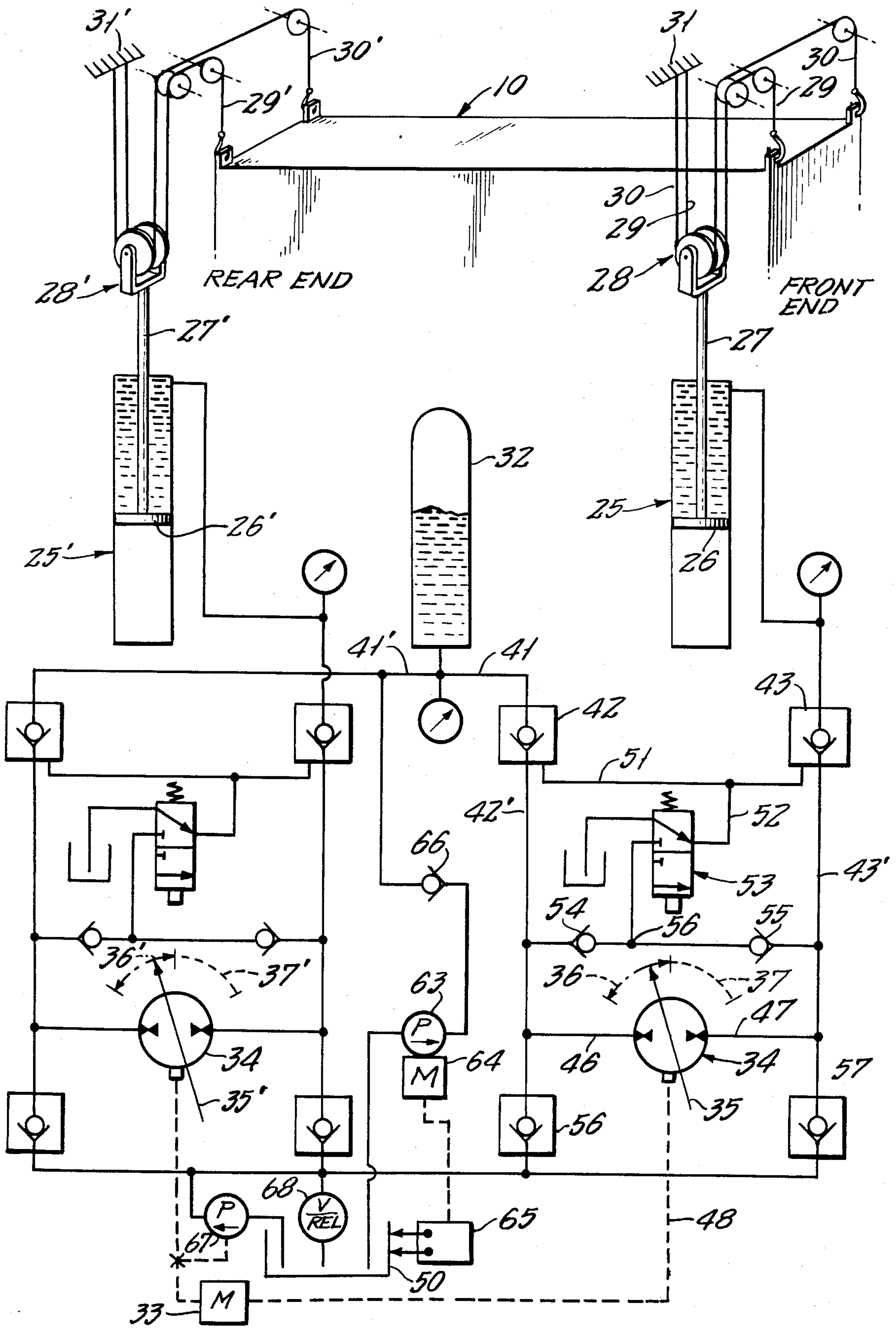
FIG. 3 is a schematic diagram to illustrate hydraulic and other mechanical features in operating the crane of FIGS. 1 and 2.

The described components of the front-end hydraulic system will be seen by inspection of FIG. 3 to have identically corresponding components for the rear-end hydraulic system, but reference numbers have been omitted from most of the rear-end system components, in order to avoid confusion.

A brief operating description will suffice for the front-end system in FIG. 3, with the understanding that if the control adjustments of the two power integrators 34–34′ are coordinated, the description of operation will apply for both systems at the same time.

Initially, one may assume a filled system wherein the pistons of cylinders 25–25′ are locked at a particular level of load (10) suspension; at the front-end system, this locking is by reason of load-induced pressure forcing closure of check valve 43, while closure of check valve 42 will have been forced by the gas-charged pressure on hydraulic fluid in the accumulator 32. Hydraulic fluid lost to sumps (collectively symbolized by the base sump or reservoir 50) will have been restored to accumulator 32 (40) by the operation of a pump 63 driven by a motor 64 in response to bi-level sensing of hydraulic fluid in sump 50, a bi-level sensitive switch 65 being shown for the purpose, controlling excitation of motor 64 for a sensed upper level at 50, and controlling disconnection of motor 64 for a sensed lower level at 50. A check valve 66 in the delivery line to the accumulator assures flow only in the direction to restore hydraulic fluid to the accumulator.

As noted above, pressure in the accumulator 32 (40) will have been selected to enable counterweighting of an average load 10 and the liquid volumetric capacity of the accumulator is such as to enable at least full displacement of the traction cylinders, without material change in accumulator pressure. Full accumulator pressure is thus applied against check valve 42 (and its counterpart in the rear-end system) at all times, and the load-reflecting ram (traction-cylinder) pressure against check valve 43 may or may not be the same; ram pressure against check valve 43 will be slightly greater than accumulator pressure if front-end load weight happens to be greater than the preselected "average", and ram pressure against check valve 43 will be slightly less than accumulator pressure if front-end load weight happens to be less than "average". By contrast, pressure on the other sides (42′–43′) of check valves 42–43 will have been relieved, first, by the normal (i.e., unactuated) state of valve 53 wherein pilot-operating pressure in line 51 is vented to sump; secondly, unavoidable minor leakage at the shaft seal of the integrators 34 (34′), (e.g., to sump via drain connection, not shown) will have relieved pilot-actuating pressures in lines 42′–43′.

As explained in said copending applications, the prime mover 33 serves not only to impart continuous motion to the rotor of the integrator 34 (34′) but also to drive an auxiliary pump 67 (a) for initial opening of both check-valves and (b) to provide fluid pressure for control purposes such as a hydraulic assist in adjusting the phase-control means 35 of the power integrator (direction and rate of flow between ports 46 and 47, as described in said pending applications); relief of such pressure above a predetermined level is provided at 68 to sump 50. A lift (or descent) operation is initiated by actuating solenoid valve 53 so as to effectively provide a connection line from distribution point 56 to the pilots of both pilot-operated check valves 42–43; if the prime mover 33 has been running, then pump 67 will have been supplying sufficient hydraulic pressure (via check valves 56–57 and 54–55) to open both valves 42–43, and if the prime mover 33 has just been started, a sufficient hydraulic pressure is almost immediately supplied to open both check valves 42–43. The action is brief and the hydraulic-fluid increment drawn from sump 50 is small because lines 42′–43′ were already full, so that the drawn increment quickly builds pilot-operating pressures. Once only partially opened, check valve 42 admits full accumulator pressure to line 42′, thereby closing check valves 54–56 and presenting accumulator pressure to port 46 of the integrator; similarly, when check valve 43 begins to open, full ram (load) pressure is established in line 43′, thereby closing check valves 55–57 and presenting ram pressure to port 47 of the integrator.

As long as prime mover 33 continues to run and solenoid valve 53 continues in its actuated state, both check valves 42–43 will be held in open condition, allowing port 46 to assume instantaneous accumulator pressure and port 47 to assume instantaneous ram (load) pressure. The prime mover 33 is connected to the rotor of each integrator 34 (34′) and will either drive the rotor, in which case the rotor acts as a hydraulic pump, or will be driven by the rotor, in which case the rotor is a hydraulic motor responding to the pressure difference at ports 46–47 (in which case also, the prime mover acts as a dynamic brake and, if an electric motor, will feed a quantum of electrical energy back into the supply grid).

More specifically, as long as the instantaneous front-end load is less than the predetermined "average", and as long as a lifting operation is called for (as by setting the control arm 35 in the lift range 36), accumulator pressure at port 46 exceeds ram pressure at port 47 and is alone sufficient for upward displacement of the front end of load 10; in this situation, the prime mover 33 provides a dynamic brake or governing action, determining the speed with which accumulator pressure (beyond ram pressure) will be permitted to lift the front end of the load. If on the other hand, the instantaneous front-end load is greater than the predetermined "average", the prime mover 33 will be a driver for displacementpump action in the integrator, raising inlet accumulator pressure at port 46 to a greater level at port 47 while also displacing a driving flow of hydraulic flow from the accumulator to the traction cylinder 25.

Termination of a lift (or of a descent) may occur when solenoid valve 53 is de-energized, to return the same to its unactuated state, wherein pilot-operating pressure at 51–52 is vented to sump, causing both pilot-operated valves to close and thus to lock the front-end hydraulic system against any continued transfer of hydraulic fluid from accumulator 32 to cylinder 25 (or from cylinder 25 to accumulator 32); alternatively, termination of a lift (or of a descent) can occur when the control arm is centrally (neutrally positioned) between ranges 36–37. When control arm 35 is moved for operation in its other range (the load-descent range 37), the desired direction of fluid transfer within integrator 34 will be reversed, namely for displacement in the direction from port 47 to port 46, and prime mover 33 will cause integrator 34 to function either as a dynamic brake or as a pump, depending on whether pressure at port 47 exceeds or is less than pressure at port 46. The rate of ascent or descent of the load is governed by the extent to which control arm 35 is displaced from its midposition, between ranges 36–37.

Figure 4:
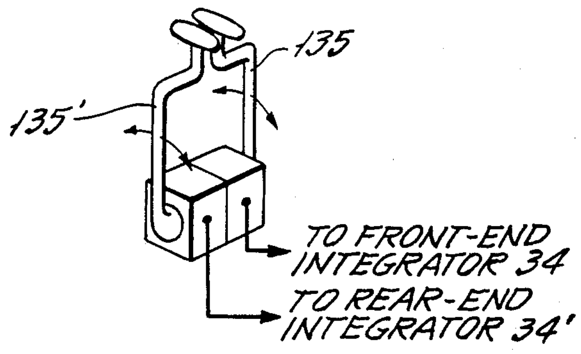
FIG. 4 is a simplified view in perspective to illustrate an arrangement which enables one-handed coordinated operation of two independent hydraulic circuits of FIG. 3.

No hydraulic pump and no hydraulic dynamic brake is 100 percent efficient, and this is true however high the efficiency of the design of the power integrators. This being the case, the volumetric displacement of hydraulic fluid in a given direction between ports 46–47, and for a given setting of arm 35, will be at one rate (volume, per unit time) for a first level of front-end load and at a slightly different rate (volume, per unit time) for a different level of front-end load. This being the case, and in the event of an uneven weight distribution in container 10 wherein one end is heavier than the other, the lifting (or descent) of the front-end load via control at integrator 34 can involve a slightly different setting of control arm 35 than the setting of control arm 35' governing lift (or descent) of the rear-end load. The differences are so slight that, with both arms 35–35' (or actuators therefor) mounted in side-by-side adjacency, as suggested at 135–135' by the simple perspective view of FIG. 4, both integrator control arms may be effectively grasped by a single hand, for angular actuation in unison; at the same time, by merely slightly twisting the grasp of these arms 135–135' so as to angularly set one of them incrementally advanced (or retarded) with respect to the other, the operator who observes any front-vs.-back tilt of the load 10 can quickly effect a corrective relative positioning of arms 135–135', so as to assure the controlled tilt or leveling of the load 10, as he may judge the same to be needed. Such corrective adjustment is made either in the course of a lifting or of a descent, or it may be made for the front-end system near the midposition (between ranges 36–37) without shifting the control arm 35' of the rear-end system from its midposition.

Figure 5:
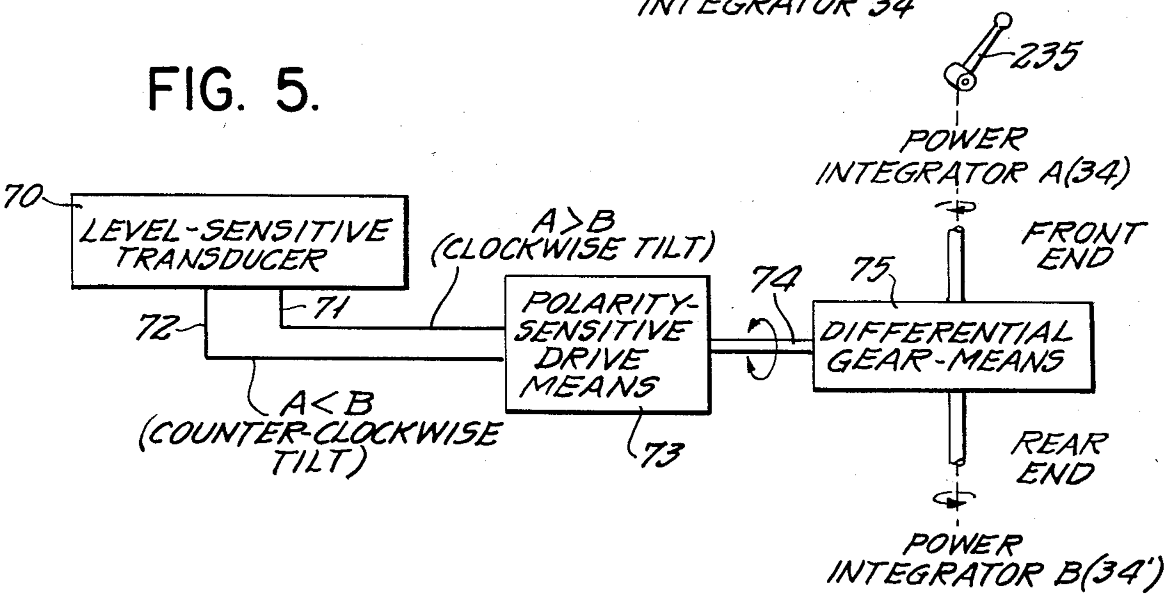
FIG. 5 is a block diagram to show a modification wherein tilt of a lifted container is self-correcting.

If reliance is not to be placed on the operator for his judgment as to level (i.e., gravity-vector with respect to load (1) orientation), then FIG. 5 schematically indicates that a level-sensitive transducer 70 may be affixed to the spreader 22 in such manner as to reflect departures from horizontal, for one of the longitudinal members of the spreader. Transducer 70 is shown to provide a first electrical output in line 71 when tilt beyond a predetermined tolerable threshold is "up" at the front end, as suggested by the symbolism $A>B$ for clockwise tilt as viewed in FIGS. 1 and 3; and transducer 70 is shown with a second electrical output in line 72 for corresponding tilt in the opposite direction of departure from horizontal, symbolized $B>A$, meaning greater rear-end lift (B) than front-end lift (A). Polarity-sensitive drive means 73 is shown responding to the applicable one of signals in lines 71–72 and providing suitably directional drive torque to the shaft 74 of differential-gear means 75 which is the means of connection as between control-arm torque to the respective adjustment means 35 (35') for integrators 34 (34'). When employing a differential mechanism to effect automatic level corrections, it should be noted that there is no longer a need for separate manually operated adjustment or control arms 35–35' for both integrators, in that one such arm (marked 235 in FIG. 5) is enough because the automatic leveling adjustment will then always be made for the rear-end hydraulic system, in reference to whatever may be the instantaneous manual positioning of arm 235 governing operation of the front-end hydraulic system.

It will be appreciated that cabling for practice of the invention can take a variety of forms, depending on the desired relation between piston (26) displacement and Z-axis displacement of the load. Two-fold, four-fold, and 8-fold multiplications of piston (26) displacement are achieved depending upon the number of frame-referenced versus piston-referenced sheave passes are provided for each of the cables. For example, a two-fold multiplication (1:2 ratio of piston retraction for load-lift displacement) as shown in FIG. 3 is typical for a yard-container crane, where the range of Z-axis positions is about 20 feet. On the other hand, for handling container freight which must be placed and removed from the hold of a container ship, a vertical displaceability range of 160 feet is possible with traction cylinders 25 (25') providing a 20-foot range of actuation, using a 1:8 cabling and sheave configuration.

Since, for simplicity, FIG. 3 dealt only with pure-lift (Z-axis) considerations, the cables 29–30 (29'–30') are shown to end with direct ties to the load 10. This is of course to have omitted consideration of Y-axis accommodation. However, in FIG. 2, both ends of each of these cables are secured to the frame of the entire crane; one of these ends has already been identified at 31, and the other is shown to terminate with connection 78 to column 12. More specifically, the horizontal course of cable 29 includes a suspension loop via idler sheaves on carriage 21 and on the near front-end corner of spreader 22, while the horizontal course of cable 30 includes a similar suspension loop via idler sheaves on the carriage and on the far front-end corner of the spreader. Similar provision applies for the rear-end cables 29'-30'.

The described invention will be seen to achieve all stated objects and to be applicable to a variety of prime-mover systems as well as to a variety of crane, hoisting and other lifting systems. The described systems of control and their coordination enable simple management of all functions including quick and efficient response to uneven weight distribution within a sealed container. The hydraulic accumulator is a counterweight in offset of predetermined average load, so that power requirements need only reflect the capacity to handle the range of departure from the predetermined average. Hydraulic fluid is conserved and automatically returned to the accumulator so that all functions are achievable for unlimited cycling of the load-transfer operations, merely by making sure that the entire system can operate between on-off limits of the bi-level switch 65.

Power requirements are substantially reduced from those for conventional systems. A yard crane of the type described and using a single 40-HP motor (electric or diesel) offers a vertical lift speed of 30 feet per minute with a 40-ton load, the accumulator being charged up to 3000 psi maximum. And for ship-loading of a similar load at similar lift speeds, a crane having traction cylinders 25 (25') that are 20 feet long with 1-foot bore diameter and 4.5-inch diameter piston rods 27 (27'), is able to provide a 150-foot range of vertical lift, using a 1:8 cable configuration, all well within the capabilities of a 200-HP diesel engine.

Because the described system operates without clutches, brakes, winches and the like, and essentially only via smoothly and continuously variable hydraulic displacements, the system is intrinsically much less vulnerable to maintenance shut-downs, as compared with existing cranes.

While the invention has been described in detail for preferred embodiments, it will be understood that modifications can be made without departure from the scope of the invention.

What is claimed is:

1. In a cable-suspended hydraulically operated lift system wherein a load is to be elevated via at least two separate cables connected to load-suspension points which are at horizontal offset from each other, the improvement wherein first and second traction cylinders are mounted for independent traction-actuation of the respective cables, a single source of pressure fluid with separate connections to said traction cylinders, said single source including a pressurized hydraulic accumulator connected as a closed system with both of said cylinders, first control means including a first power integrator operative in the connection of the accumulator to one of said cylinders, second control means including a power integrator operative in the connection of the accumulator to the other of said cylinders, each of said control means determining the direction of fluid flow vel non and the rate of fluid flow to and/or from the accumulator from and/or to the associated traction cylinder, each said power integrator having a rotor adapted for connection to a prime mover, and a single prime mover connected for simultaneous drive of both power-integrator rotors.

2. The improvement of claim 1, in which said prime mover is a reversible electric motor.

3. The improvement of claim 1, in which said prime mover is a single-direction electric motor, and in which each of said control means includes means for reversibly selecting the direction of flow through the associated integrator.

4. The improvement of claim 1, in which said prime mover is a diesel engine, and in which each of said control means includes means for reversibly selecting the direction of flow through the associated integrator.

5. The improvement of claim 1, wherein the load is to be elevated via four separate cables connected to the respective corners defined by first and second pairs of transversely spaced load-suspension points which pairs are at longitudinal offset from each other, the first pair of load-suspension points being served by two cables having actuating connection to one of said cylinders, and the second pair of load-suspension points being served by two cables having actuating connection to the other of said cylinders.

6. The improvement of claim 1, in which each of said control means includes a single actuating lever, and a single mount of both actuating levers in side-by-side relation to each other.

7. The improvement of claim 6, in which said levers are in such adjacency that they may be actuated by a single manual grasp of both levers, whereby the two levers may be given the same actuating advance at the same time, with the option of phase-adjusting one lever actuation with respect to the other.

8. The improvement of claim 1, in which levelsensitive transducer means is mounted for response to a tilted departure of said load-suspension points from a horizontally level condition, said transducer producing an electrical output which is characterized by the direction of tilt for a predetermined magnitude of tilt with respect to said level condition, and means responsive to said electrical output and connected to at least one of said control means for actuating the same in the direction to reduce the degree of tilt.

9. The improvement of claim 8, in which said means responsive to said electrical output is differentially connected to both said control means, whereby tilt reduction results from an automatically controlled incremental lift adjustment for one of said points and a concurrent controlled decremental lift adjustment for the other of said points.

10. In a cable-suspended hydraulically operated lift system wherein a load is to be elevated via a plurality of separate cables which are at horizontal offset from each other, the improvement wherein plural separate traction cylinders are mounted each for independent operation of a different one of said cables, a single source of hydraulic fluid with separate connections to said traction cylinders, said single source including a pressurized hydraulic accumulator connected as a closed system with said plural cylinders, control means including a separate power integrator in each connection of the accumulator to a different one of said cylinders, each such control means and its power integrator determining the direction of fluid flow and the rate of fluid flow to and/or from the accumulator from and/or to the associated traction cylinder, each said power integrator having a rotor adapted for connection to a prime mover, and a single prime mover connected for simultaneous drive of both power integrators.

* * * * *